Figure 1:
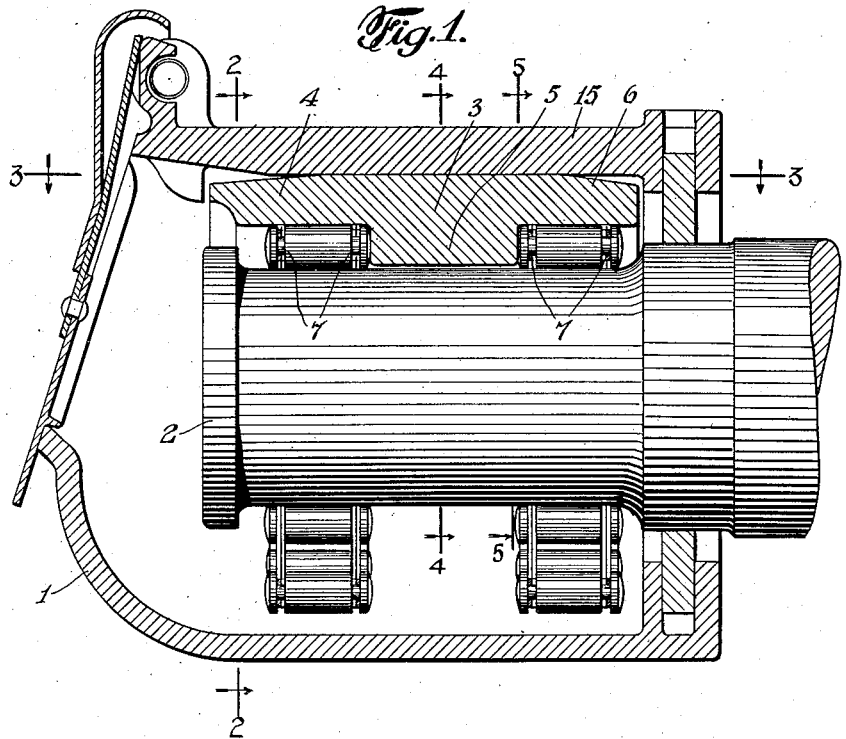

July 12, 1927.

G. R. MORAN 1,635,685

BEARING FOR RAILROAD TRUCKS AND SIMILAR STRUCTURES

Filed Dec. 10, 1923

2 Sheets-Sheet 1

INVENTOR
George R. Moran
BY
Kenyon & Kenyon
ATTORNEYS

July 12, 1927.
G. R. MORAN
1,635,685
BEARING FOR RAILROAD TRUCKS AND SIMILAR STRUCTURES
Filed Dec. 10, 1923   2 Sheets-Sheet 2
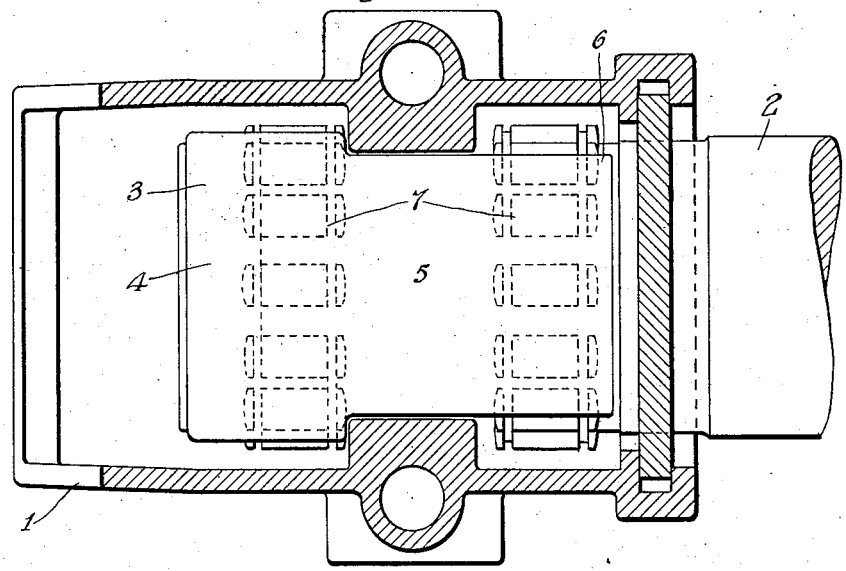
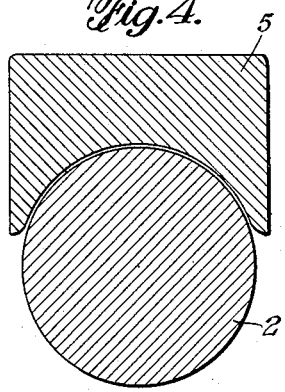
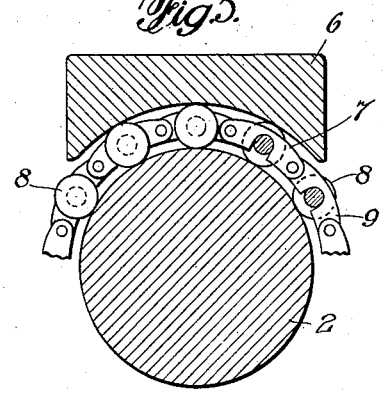
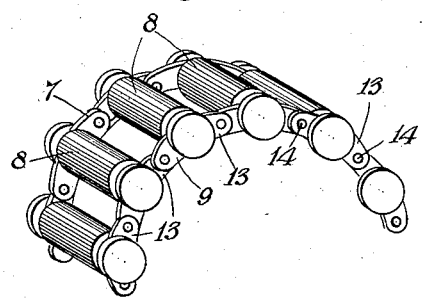
INVENTOR
George R. Moran
BY Kenyon & Kenyon
ATTORNEYS Patented July 12, 1927.

1,635,685

UNITED STATES PATENT OFFICE.

GEORGE R. MORAN, OF SANDUSKY, OHIO.

BEARING FOR RAILROAD TRUCKS AND SIMILAR STRUCTURES.

Application filed December 10, 1923. Serial No. 679,518.

My invention has for its object to provide revoluble anti-friction bearings or bearing surfaces for use in journal boxes of railroad trucks and similar structures; to provide such devices as can easily be placed in position in a journal box or be removed therefrom without any change in the size, form or proportions of the standardized journal boxes now in use and without any adjustment other than the mere lifting of the journal box and the insertion or removal of such anti-friction devices; also to provide such devices as can be substituted in place of the non-revolving brass and wedge anti-friction devices now universally used with the journal boxes of railroad trucks without any change in the form, size or proportions of the journal boxes now in use.

Heretofore it has been the universal practice to use non-revolving brass and wedge anti-friction surfaces in the journal boxes of railroad trucks and similar structures; no revoluble anti-friction bearings have been in practical use in such connection except in an experimental way, and such attempts have always failed. Attempts have been made to introduce ball or roller bearings, but these all involved such radical changes in the size, form and dimensions or proportions of the journal box and axle, and the work of installation, removal and replacing such devices has required such skill and experience and also special machinery of such an expensive character, that all such attempts have failed. It has also been found impossible to provide the necessary special machinery and the necessary skill and experience at the countless points where substitution of one bearing for another becomes necessary.

My device is so simple and can be so shaped and proportioned as to fit into the regular standardized size and style of journal box and axle universally used in all railroad trucks, and this without any change whatever in the journal box or axle. It can be substituted at once for the universally standardized, loose, removable and replaceable non-revolving wedge and brass bearings and a worn-out bearing can be removed and replaced with a new one with equal facility. My improved device can be substituted for such standardized bearings now in use by merely lifting the journal box and taking out the wedge and brass pieces and substituting my device in place thereof, and similarly, when my improved device is worn out, it can be removed and replaced by a new one with equal ease.

In the drawings accompanying this specification, I have shown my device in its preferred form, and I will now proceed to describe that form as shown in the drawings.

Figure 2:
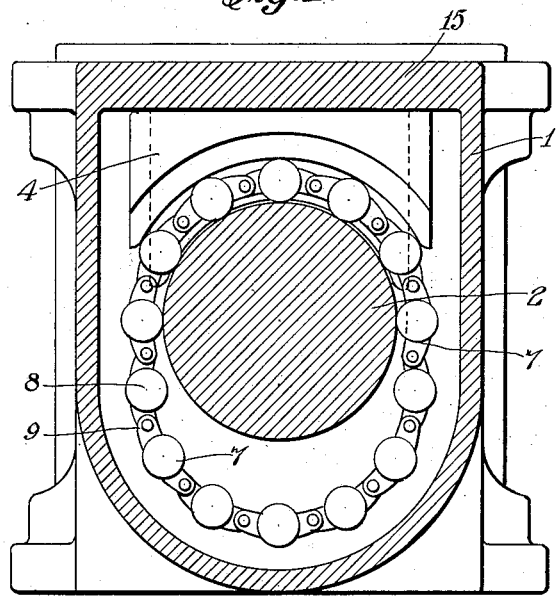

Figure 1 is a side view of my improved device in its preferred form, as mounted in the journal box of a railroad truck, parts being shown in section. In this view the loose series of roller bearings and their supporting flexible rings are shown as encompassing only the rear half of the axle. Figure 2 is a vertical cross section taken on the lines 2—2 of Figure 1. Figure 3 is a plan view of my improved device in place on the axle, taken on the lines 3—3 of Figure 1. Figure 4 is a vertical cross-section taken through the axle and the middle or intermediate supporting part of my anti-friction bearing piece, taken on the line 4—4 of Figure 1. Figure 5 is a similar view taken through one of the end parts of my anti-friction bearing piece on the line 5—5 of Figure 1, and also showing a part of one of the loose series of revoluble roller bearings. Figure 6 is a perspective view of a part of one of the loose series of the revoluble rollers; and Figure 7 is a view of the preferred form of roller.

Referring to the drawings, 1 represents the usual or standardized journal box of a railroad truck, and 2 the axle. 3 is an anti-friction bearing piece. It may be made of any suitable shape. As shown it consists of three parts, an end part 4, a central or intermediate supporting part 5 and an end part 6. The part 5 connects the parts 4 and 6, so that the anti-friction bearing piece forms one integral whole that can be easily inserted into position and be removed. The part 5 is greater in height so that it extends nearer the axle, as shown in Figure 1. Its lower surface is curved, as shown in Figure 4, and when in position is slightly removed from the axle. The part 4 is made wider or deeper than the parts 5 and 6, as shown in Figure 3. This is done in my preferred form to adapt the anti-friction bearing piece to the size and dimensions of the standardized journal box, 5 and 6 being of the same width. While the shape and dimensions of the anti-friction bearing piece may be modified as desired, the form shown in the drawings has the advantage that it is adapted in size, form and dimensions to the standardized journal box uniformly in use in railroad trucks. The end pieces 4 and 6 have similarly their lower surfaces curved, as shown in Figure 5, and when the anti-friction bearing piece is in place considerable space is left between this lower curved surface and the rounding upper surface of the axle. In this space I place a loose series 7 of revoluble roller bearings, flexibly connected together. As shown, each series is composed of a series of rollers 8, 8, connected at each of their ends by flexible rings 9, 9. These rings support the rollers and connect them together in a continuous endless series. The rollers may be of any suitable form, but in practice I prefer that shown in Figure 7, where the roller is composed of a central body 10, rounding ends 11, 11, each connected with the part 10 by a narrower portion 12, all forming one integral structure. The flexible rings may be made in any suitable way to connect or support the rollers. In the form shown, this chain consists of links 13, 13, adjacent links being pivoted at their ends as at 14. Each link has a central ring-like portion which takes over the narrowed portion 12 of a roller 8. The detail of this connection is of no importance and is not shown in detail. It could consist, for example, of a split ring sufficiently spring-like so as to be snapped over or off the narrowed portion 12 of the roller. Each roller has of course one of these supporting flexible rings at each end. The rollers and the supporting flexible rings constitute a loose series of roller bearings, each roller being free to revolve between the turning axle and the lower curved surface of the non-revolving anti-friction bearing piece, and each series of roller bearings being free to revolve around the axle. In practice I prefer to make each completed series of roller bearings sufficiently long so that its lower half will be below and free from the axle, as shown in Figure 2.

It will be understood that each series of roller bearings can be easily placed upon or removed from the axle, either by slipping it over the end of the axle or by disconnecting two of the links.

In practice all that is necessary to place my improved device in position in a journal box is to jack up or lift the journal box, insert the two series of roller bearings and their flexible supporting or connecting rings in proper place, and then insert the anti-friction bearing piece in the proper place above them, and lower the journal box. They can be easily removed from position by reversing the above operation. They are held in place by the axle and the parts of the journal box. It will thus be seen that the two parts of my improved device can be placed in position and removed from position exactly as are the wedge and brass pieces now in universal use in journal boxes of railroad trucks. No change in the shape, form or dimensions of journal box or axle is needed to enable my device to be used either in place of the present wedge and brass pieces, or to enable my improved device to be removed from position and replaced by others.

My improved device forms a revoluble and efficient roller bearing. It has all the advantages of revoluble roller bearings without any of the expensive and difficult changes heretofore necessary for ball or roller bearings, without any difficulty of placement or replacement, without the necessity of expensive equipment for such purposes, and it provides a device interchangeable with existing anti-friction devices and interchangeable with other devices of the same character. My improved device takes the thrusts incident to journal boxes in precisely the same way that the present wedge and brass pieces do. It is also self-adjusting as to wear.

While my improved device is especially applicable to journal boxes of railroad trucks, it is not confined in use to them, but may be employed where extremely heavy loads are carried in similar manner, or where there are heavy overhung rotated parts, such for instance as propeller shafts in marine work, suction rollers in paper making, some types of rollers in steel mills, and in other similar structures.

What I claim as new and desire to secure by Letters Patent is:

1. In a journal box the combination with an axle of a bearing piece composed of a central portion and two end portions, said central portion being of greater thickness than said end portions, said portions having their lower surfaces curved, and series of revoluble roller bearings flexibly connected together, said roller bearings being mounted between said axle and the end portions of said bearing piece and spaced apart by said central portion.

2. In a journal box the combination with an axle of a bearing piece composed of a central portion and two end portions, said central portion being of greater thickness than said end portions, each of said portions having its lower face curved in conformity with the surface curvature of said axle, and a series of articulated roller bearings mounted between said axle and said end portions, said roller bearings serving to hold the curved face of said central portion out of contact with said axle.

In testimony whereof, I have signed my name to this specification.

GEORGE R. MORAN.